(12) United States Patent
Yamada et al.

(10) Patent No.: US 9,350,669 B2
(45) Date of Patent: May 24, 2016

(54) NETWORK APPARATUS, PERFORMANCE CONTROL METHOD, AND NETWORK SYSTEM

(71) Applicant: HITACHI, LTD., Tokyo (JP)

(72) Inventors: Masaki Yamada, Tokyo (JP); Takashi Isobe, Tokyo (JP); Tomoyuki Oku, Tokyo (JP); Yuichi Ishikawa, Tokyo (JP); Takeki Yazaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 14/149,109

(22) Filed: Jan. 7, 2014

(65) Prior Publication Data

US 2014/0192647 A1      Jul. 10, 2014

(30) Foreign Application Priority Data

Jan. 8, 2013 (JP) .................................. 2013-000877

(51) Int. Cl.
*H04J 1/16* (2006.01)
*H04L 12/801* (2013.01)

(52) U.S. Cl.
CPC ............. *H04L 47/127* (2013.01); *H04L 47/193* (2013.01)

(58) Field of Classification Search
CPC ............................ H04L 47/127; H04L 47/193
USPC .................................................. 370/229–240
See application file for complete search history.

(56) References Cited

U.S. PATENT DOCUMENTS 5,400,329 A * 3/1995 Tokura et al. ................. 370/232
6,366,761 B1 * 4/2002 Montpetit .................... 455/12.1

FOREIGN PATENT DOCUMENTS

JP    2009-111707 A    5/2009
JP    2011-250237 A    12/2011

* cited by examiner

*Primary Examiner* — Mang Yeung
(74) *Attorney, Agent, or Firm* — Mattingly & Malur, PC (57) ABSTRACT

To prevent the switching time influences power saving efficiency and packet loss prevention performance, it is provided a network apparatus for transferring packets, including a transfer part for transferring received packets to a given destination, and a determining part for obtaining traffic volume of the packets to be transferred. The determining part determines periodicity of changes to the traffic volume, predicts traffic volume after a predetermined period of time with use of the determined periodicity, and controls transfer performance of the transfer part based on a result of the traffic volume prediction.

9 Claims, 10 Drawing Sheets

NETWORK APPARATUS, PERFORMANCE CONTROL METHOD, AND NETWORK SYSTEM

CLAIM OF PRIORITY

The present application claims priority from Japanese patent application JP 2013-877 filed on Jan. 8, 2013, the content of which is hereby incorporated by reference into this application.

BACKGROUND OF THE INVENTION

This invention relates to a network apparatus.

Reduction of power consumption is demanded of a network apparatus. There has been particularly studied a method of cutting excessive power consumption by controlling the performance of the network apparatus to the one, which is sufficient for transfer performance.

JP 2009-111707 A and JP 2011-250237 A are given as background art of a technical filed to which this invention belongs.

JP 2009-111707 A discloses a packet transfer apparatus that includes a header processing part. The header processing part includes a plurality of packet processing circuits for executing packet processing. A circuit count determining circuit determines whether or not a packet processing circuit is in operation by monitoring the count of lines, over which communication is held, and the volume of traffic input from the lines. Based on the results of this determination, power supply and clocks are shut off for packet processing circuits that are not needed, thereby realizing power saving of the packet transfer apparatus.

In order to reduce power consumption depending on performance in this manner, required performance needs to be predicted/estimated precisely. This is because insufficient performance deteriorates communication quality by causing a packet loss, aggravating delay, and the like. JP 2011-250237 A discloses a method involving controlling the operation of a plurality of packet processing circuits that are included in a packet transfer apparatus. The method disclosed in JP 2011-250237 A includes a first step of accumulating packet information history of packets that are input to and output from the packet transfer apparatus in unit time, a second step of calculating an input band of packets that are input to the packet transfer apparatus per unit time based on the packet information history, a third step of calculating the count of packets that are accumulated in a queue of the packet transfer apparatus per unit time based on the packet information history, a fourth step of setting processing performance control information for packet processing circuits that are allowed to operate depending on the input band per unit time and the packet count per unit time, and a fifth step of controlling the operation of the plurality of packet processing circuits based on the set control information.

SUMMARY OF THE INVENTION

The related-art performance prediction method described above controls the performance of a network apparatus after an increase in traffic is detected. Accordingly, power saving efficiency is sacrificed in some cases by allowing a large performance margin to prevent packet loss in case of burst traffic. And still, preventing all packet loss is impossible. In short, power saving efficiency and packet loss rate have a trade-off relation in the control according to the method. Performance estimation is necessary to avoid communication quality deterioration.

The related-art performance prediction method also requires a switching time to change the performance of a network apparatus. This means that, unless the switching time since the traffic increase actually occurs until the packet transfer performance actually changes, is short, a packet loss can occur. The related-art method therefore has a problem in that the length of the switching time influences power saving efficiency and packet loss prevention performance.

The representative one of inventions disclosed in this application is outlined as follows. There is provided a network apparatus for transferring packets, including a transfer part for transferring received packets to a given destination, and a determining part for obtaining traffic volume of the packets to be transferred. The determining part determines periodicity of changes to the traffic volume, predicts traffic volume after a predetermined period of time with use of the determined periodicity, and controls transfer performance of the transfer part based on a result of the traffic volume prediction.

According to the exemplary embodiment of this invention, communication quality and power saving efficiency can be balanced. Other objects, configurations, and effects than those mentioned above are revealed in the following description of embodiments.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

First Embodiment

A first embodiment of this invention is described.

Figure 1:
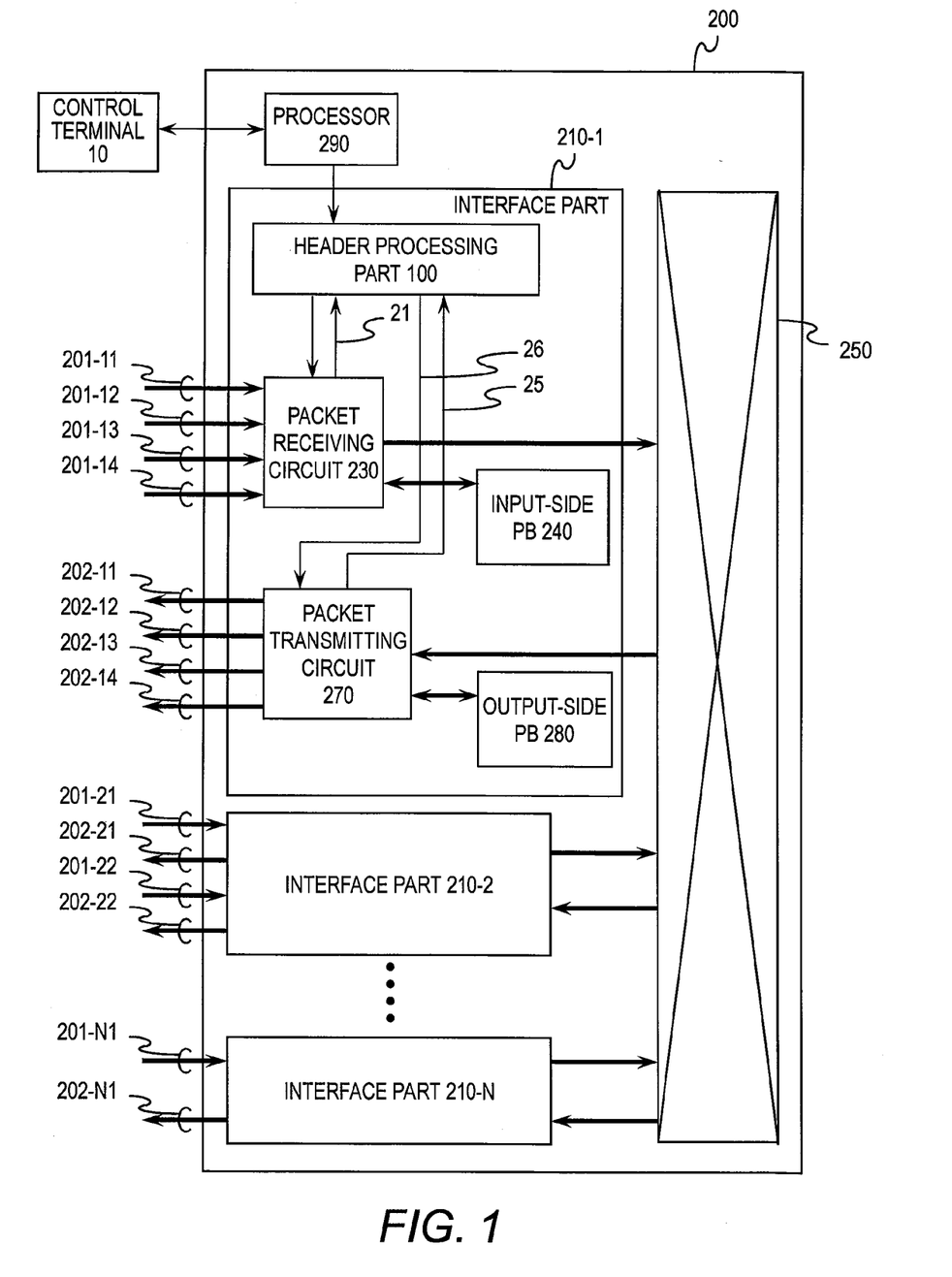
FIG. 1 is a block diagram illustrating the configuration of a packet transfer apparatus according to a first embodiment.

FIG. 1 is a block diagram illustrating the configuration of a packet transfer apparatus 200 according to the first embodiment.

The packet transfer apparatus 200 includes N interface parts, which are each denoted by 210-$i$ (i=1 to N), a header processing part 100, a packet relay processing part 250, which connects the interface parts 210, and a processor 290. The processor 290 is connected to a control terminal 10 to notify instructions from the control terminal 10 to the interface parts 210, and to notify information of the interface parts 210 to the control terminal 10. To each interface part 210-$i$, M input lines which are each denoted by 201-$ij$ (i=1 to N, j=1 to M) and M output lines which are each denoted by 202-$ij$ (i=1 to N, j=1 to M) are connected.

Specifically, the interface part 210-1 accommodates input lines 201-11 to 201-14 and output lines 202-11 to 202-14. The interface part 210-2 accommodates input lines 201-21 and 201-22 and output lines 202-21 and 202-22. The interface part 210-N accommodates an input line 201-N1 and an output line 202-N1. The interface part 210-$i$ includes a packet receiving circuit 230 which executes packet receiving processing, an input-side packet buffer (PB) 240, a packet transmitting circuit 270 which executes packet transmitting processing, and an output-side packet buffer (PB) 280.

Figure 2:
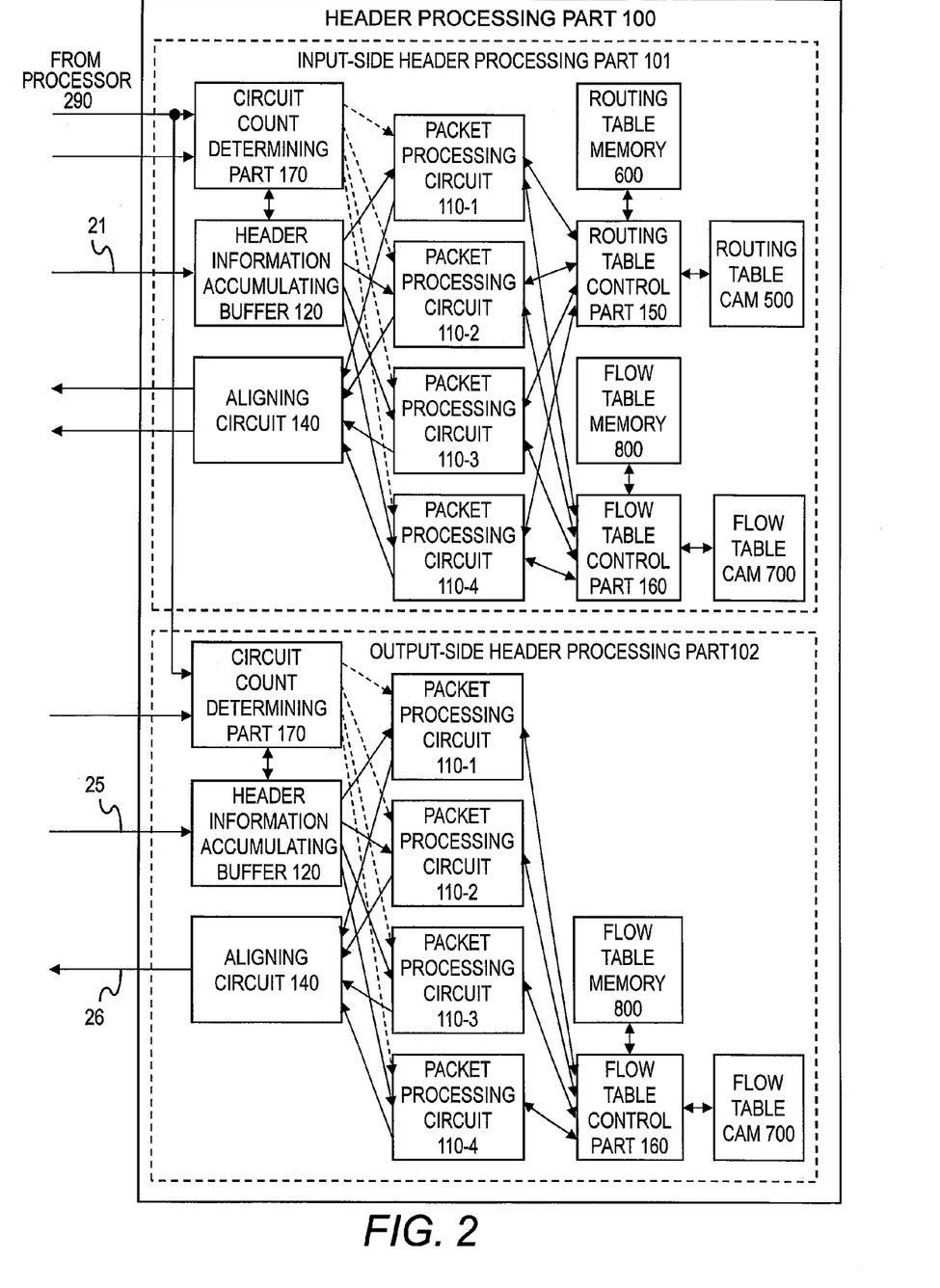
FIG. 2 is a block diagram illustrating the configuration of the header processing part according to the first embodiment.

FIG. 2 is a block diagram illustrating the configuration of the header processing part 100. Details of the operation of the header processing part 100 are described with reference to FIG. 2.

The header processing part 100 includes an input-side header processing part 101 and an output-side header processing part 102. The input-side header processing part processes packets with the use of header information 21, which is notified from the packet receiving circuit 230. The output-side header processing part 102 processes packets with the use of header information 25, which is notified from the packet transmitting circuit 270.

The input-side header processing part 101 includes a routing table CAM 500, a routing table memory 600, a flow table CAM 700, a flow table memory 800, a plurality of packet processing circuits which are each denoted by 110-$k$, a routing table control part 150, and a flow table control part 160. The routing table CAM 500 is used in output destination determining processing. The flow table CAM 700 is used in flow processing. Each packet processing circuit 110-$k$ is a circuit for executing the output destination determining processing and the flow processing by accessing the routing table control part 150 and the flow table control part 160, respectively. Four packet processing circuits 110, for example, are provided in each input-side header processing part 101. The routing table control part 150 accesses the routing table CAM 500 and the routing table memory 600 in response to a request to access the routing table CAM 500 and the routing table memory 600 from the packet processing circuit 110-$k$. The flow table control part 160 accesses the flow table CAM 700 and the flow table memory 800 in response to a request to access the flow table CAM 700 and the flow table memory 800 from the packet processing circuit 110-$k$.

The output-side header processing part 102 receives the header information 25 and executes the flow processing to transmit flow information 26 to the packet transmitting circuit 270. The output-side header processing part 102 has the same configuration as that of the input-side header processing part 101, except that the routing table control part 150, the routing table memory 600, and the routing table CAM 500 are not included in the output-side header processing part 102.

When the header information 21 is input to the input-side header processing part 101, a header information accumulating buffer 120 accumulates the input header information for each input line in the order of input. The header information accumulating buffer 120 receives from the packet processing circuit 110-$k$ a busy signal (not shown in FIG. 2) which indicates whether or not the packet processing circuit 110-$k$ is processing a packet. A piece of header information 21 that has arrived the earliest is then read out of the header information accumulating buffer 120 and transferred to the packet processing circuit 110-$k$ that is not processing a packet.

The destination determining processing is described next.

In the destination determining processing, the packet processing circuit 110-$k$ first transmits destination address information and a routing table search request to the routing table control part 150. The routing table control part 150 transmits to the routing table CAM 500 the received destination address information and routing table search request as a destination address information search key. The routing table CAM 500 returns address information that corresponds to the received destination address information to the routing table control part 150.

Based on the address information received from the routing table CAM 500, the routing table control part 150 obtains destination information that is stored in the routing table memory 600 at a corresponding address, and returns the obtained destination information to the packet processing circuit 110-$k$ that has transmitted the routing table search request.

The destination of a received packet is determined through the processing described above.

The flow determining processing is described next.

In the flow determining processing, the packet processing circuit 110-$k$ first transmits to the flow table control part 160 a 5-tuple which is a part of packet header information that is used to identify the same flow, and a flow table search request. The 5-tuple includes a source IP address (SIP), a destination IP address (DIP), an IP protocol type (PR), a source port number (SPT), and a destination port number (DPT). The flow table control part 160 transmits the received flow table search request to the flow table CAM 700 with the 5-tuple as a search key. The flow table CAM 700 transmits address information that corresponds to the received 5-tuple to the flow table control part 160.

Based on the address information received from the flow table CAM 700, the flow table control part 160 obtains flow control information (for example, filter information or QoS information) that is stored in the flow table memory 800 at a corresponding address, and returns the obtained flow control information to the packet processing circuit 110-$k$ that has transmitted the flow table search request.

Flow control information of a received packet is obtained through the processing described above.

The packet processing circuit 110-$k$ sends the received results of the destination determining processing and flow determining processing to an aligning circuit 140. The aligning circuit 140 sorts the received pairs of destination information and flow control information in the order of sequence number for each input line, and transmits the sorted information.

The packet transfer apparatus 200 of this embodiment is capable of controlling the packet processing performance and power consumption of the packet transfer apparatus 200 by changing the count of packet processing circuits 110 that are in operation. A circuit count determining part 170 controls how many packet processing circuits 110 are put into operation. The circuit count determining part 170 receives reception traffic information from the header information accumulating buffer 120, predicts required transfer performance, and determines the count of packet processing circuits 110 to be put into operation based on the result of the prediction. The circuit count determining part 170 notifies the result of determining how many packet processing circuits 110 are to be put into operation to the packet processing circuits 110 and header information accumulating buffer 120 of the same header processing circuit 100 to which the circuit count determining part 170 belongs. With this notification, electrical connection to the packet processing circuits 110 that are not in use is cut off. The header information accumulating buffer 120, too, stops transferring header information to the shut down packet processing circuits 110, and transfers header information to other header processing circuits 110 which are in operation.

How the circuit count determining part 170 determines transfer performance is described next.

Figure 3:
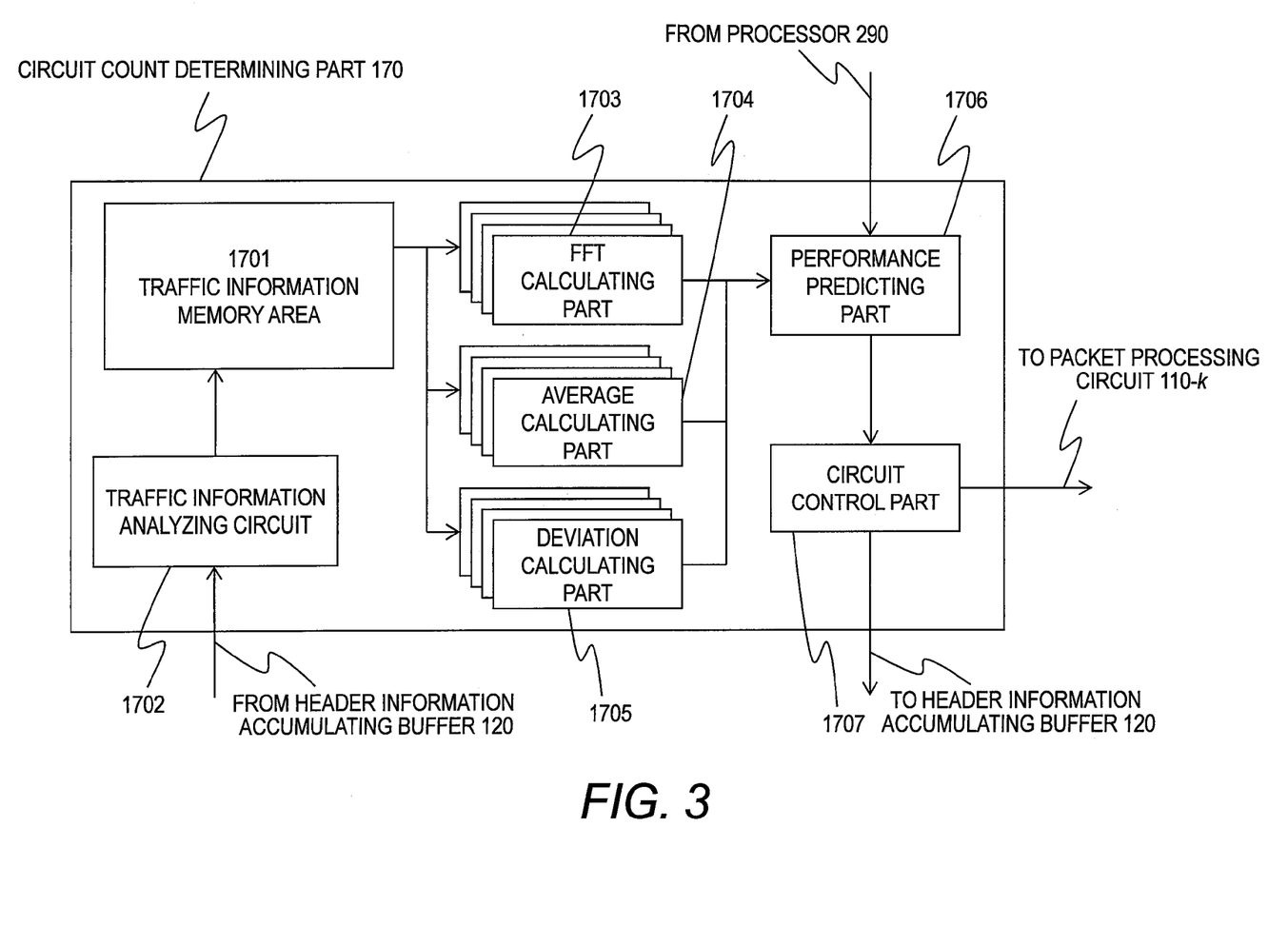
FIG. 3 is a block diagram illustrating the configuration of the circuit count determining part of the first embodiment.

FIG. 3 is a block diagram illustrating the configuration of the circuit count determining part 170 according to the first embodiment.

The circuit count determining part 170 includes a traffic information memory area 1701, a traffic information analyzing circuit 1702, an FFT calculating part 1703, an average calculating part 1704, a deviation calculating part 1705, a performance predicting part 1706, and a circuit control part 1707.

The traffic information memory area 1701 stores, for the calculation of transfer performance, a log of reception traffic volume information notified from the header information accumulating buffer 120. The traffic information analyzing circuit 1702 analyzes traffic information and stores the result in the traffic information memory area 1701. The FFT calculating part 1703, the average calculating part 1704, and the deviation calculating part 1705 calculate with the use of information stored in the traffic information memory area 1701. The performance predicting part 1706 predicts performance by consolidating calculation results. The circuit control part 1707 sends a control signal to the packet processing circuit 110-$k$.

Figure 4:
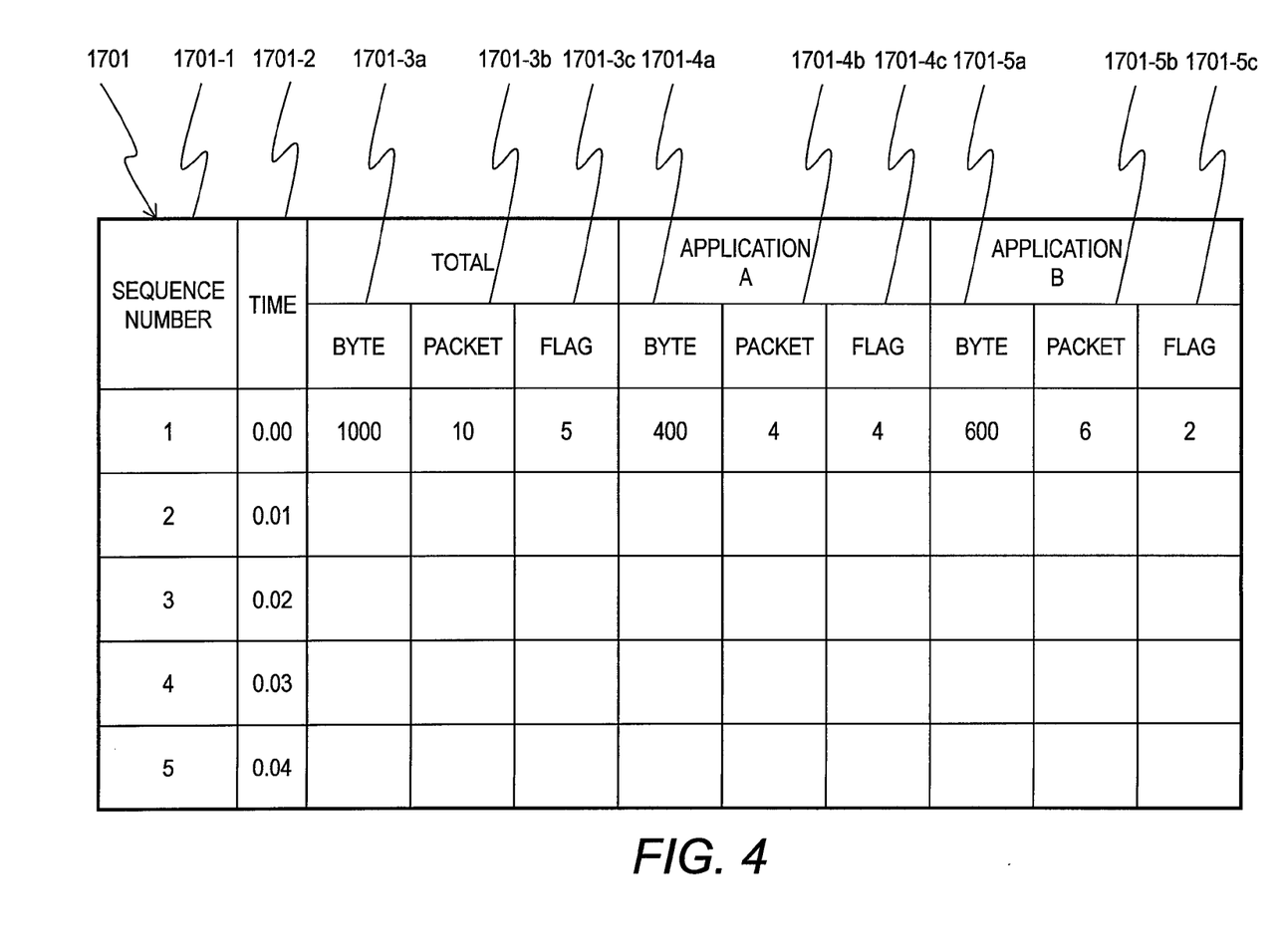
FIG. 4 is a diagram illustrating an example of the configuration of a table that is stored in a memory area.

FIG. 4 is a diagram illustrating an example of the configuration of a table that is stored in the traffic information memory area 1701.

In the traffic information memory area 1701, stores data at a predetermined timing (for example, once per minute, day or so on). The data includes different types of data collected at the same point of time. Data collected at a different timing becomes a different entry. Entries contained in the traffic information memory area 1701 runs as a ring structure where the oldest data is over written by the latest data.

The table stored in the traffic information memory area 1701 consists of a sequence number 1701-1, time information 1701-2, a total traffic byte count 1701-3a, a total traffic packet count 1701-3b, a total traffic flag count 1701-3c, a byte count 1701-4a, packet count 1701-4b, and flag count 1701-4c of one application type, and a byte count 1701-5a, packet count 1701-5b, and flag count 1701-5c of another application type.

The sequence number 1701-1 is used to identify the beginning of the data and to determine whether there is a piece of data that is missing. The time information 1701-2 defines when the data was stored.

The byte count 1701-3a and the packet count 1701-3b are a total of the byte count and packet count of packets received in each time period. The flag count 1701-3c is the total number of SYN flags of TCP headers.

The byte count 1701-4a and the packet count 1701-4b are respectively a total byte count and packet count of packets received in each time period, and is sent to or by a particular application A. The flag count 1701-4c is a value that indicates the accumulated count of SYN flags of TCP headers involved with application A. The byte count 1701-5a, the packet count 1701-5b, and the flag count 1701-5c are similarly recorded for another application B.

The flag count 1701-3c, the flag count 1701-4c, and the flag count 1701-5c are all number of SYN flags. The table may also include a field for recording the number of FIN flags.

Statistical information can be collected for each application type by identifying the type of an application from a port number which is contained in the TCP header or UDP header of a packet.

The FFT calculating part 1703 performs fast Fourier transform calculation against the collected statistical information. The periodicity of the statistical information can be determined from the result of the fast Fourier transform calculation. The average calculating part 1704 calculates an average value of the statistical information. The average value calculated may be a weighted average (for example, late statistical values are weighted more heavily). The deviation calculating part 1705 calculates a standard deviation for statistical values.

The FFT calculating part 1703, the average calculating part 1704, and the deviation calculating part 1705 each include at least one arithmetic processor. Each arithmetic processor executes calculation for all traffic or for each application. For instance, the arithmetic processor of the FFT calculating part 1703 calculates the count of all packets received, another of the arithmetic processors calculates the count of packets received with respect to the application A, still another of the arithmetic processors calculates the byte count of packets received per unit time with respect to the application A, and yet still another of the arithmetic processors calculates the byte count of packets received per unit time with respect to the application B.

The performance predicting part 1706 consolidates calculation results of the FFT calculating part 1703, the average calculating part 1704, and the deviation calculating part 1705 to predict performance required in the future (for example, performance required after a predetermined period of time). The processor 290 inputs to the performance predicting part 1706 a control signal for switching the method of prediction of the performance predicting part 1706, a control signal for amending a performance prediction result, and other similar control signals. The processor 290 also inputs to the performance predicting part 1706 a control signal that instructs the FFT calculating part 1703, the average calculating part 1704, and the deviation calculating part 1705 to start/stop calculating, change the specifics of the calculations, or the like.

The required performance predicted by the performance predicting part 1706 is sent to the circuit control part 1707. The circuit control part 1707 selects the packet processing circuits 110 that are to be in operation and transmits a control signal based on the result of the selection to the packet processing circuits 110 and the header information accumulating buffer 120. By selecting the packet processing circuits 110 to be put into operation in this manner, the transfer performance and power consumption of the header processing part 100 are controlled.

Details of the performance prediction which uses FFT are described next. In this embodiment, a cyclic component of traffic in a network is detected by a calculation that uses fast Fourier transform or discrete Fourier transform. Future traffic is predicted based on the detected cyclic component.

Figure 5:
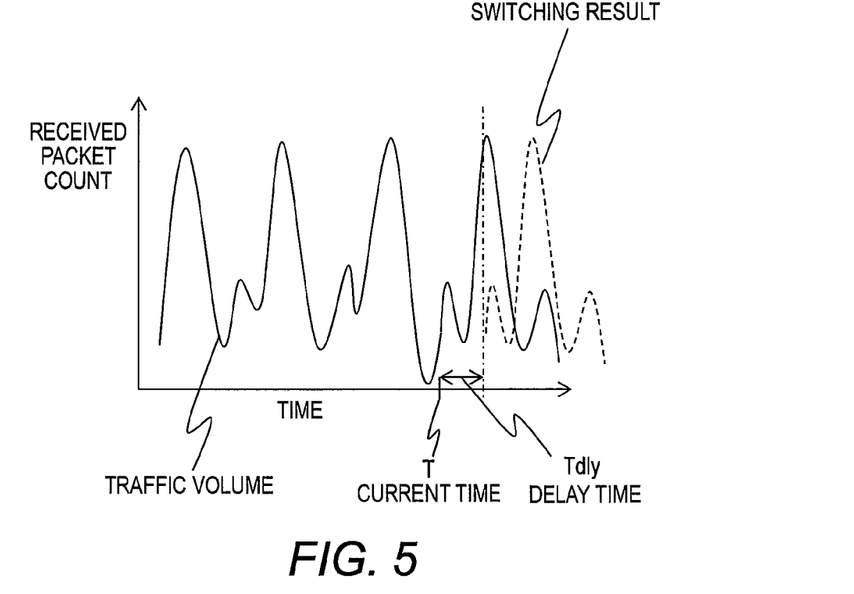
FIG. 5 is a diagram illustrating an example of traffic that has periodicity.

FIG. 5 is a diagram illustrating an example of traffic that has periodicity. In FIG. 5, the axis of ordinate represents the received packet count and the axis of abscissa indicates the passage of time flowing rightwards. The current time is denoted by T and a delay time from performance prediction till the completion of performance switching is denoted by Tdly in FIG. 5. This means that, although performance switching based on a prediction result is instructed at the time T, actual performance switching takes place at a time "T+Tdly".

In case where traffic is monitored in order to raise or lower performance depending on the current traffic volume, if the duration of a burst is shorter than the delay time Tdly which is a time required to complete performance switching as in FIG. 5, performance is switched after the burst ends. Accordingly, even though performance switching is instructed in response to a change in actual traffic, the actual traffic state has shifted by the time performance switching is completed as indicated by a switching result drawn in a broken line in FIG. 5, which does not constitute effective switching.

This embodiment solves this by deriving a cyclic component of traffic with the use of FFT and predicting traffic from the derived cycle of changes.

Figure 6:
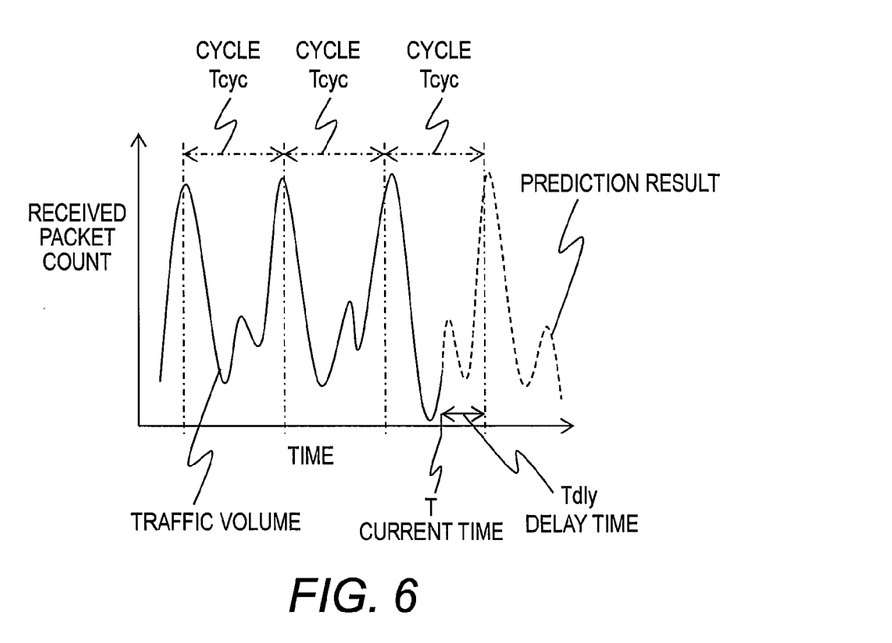
FIG. 6 is a diagram illustrating a traffic volume prediction result according to the first embodiment.

FIG. 6 is a diagram illustrating a traffic volume prediction result according to the first embodiment.

A spectrum of a frequency 1/Tcyc is detected by FFT in traffic of FIG. 6. In other words, a periodicity of Tcyc is observed in the traffic of FIG. 6. Traffic can have not only a long-term periodicity such as a day-long cycle but also a short-term periodicity such as a millisecond-long cycle due to a communication protocol or a delay in a communication path. This embodiment pays attention to the short-term periodicity.

In FIG. 6, performance at the time "T+Tdly" is predicted by taking into consideration the delay time Tdly which is a time required to complete performance switching relative to the current time T. With the periodicity of Tcyc in mind, past traffic referred to is traffic at a time "T+Tdly−Tcyc", a time "T+Tdly−2×Tcyc", and a time "T+Tdly−3×Tcyc". These points in time correspond to timing points drawn in dot-dash lines, and a burst peaks at each of the points. Consequently, it is predicted that a burst peaks at a time "T+Tdly" as well. With the method of this embodiment, prediction that takes the delay Tdly into account from the start is accomplished, and a prediction result as the one indicated by the broken line in FIG. 6 which follows the trend of traffic is obtained.

Statistical information in which traffic information is accumulated for each application in the traffic information memory area 1701 may further be used in order to improve the precision of performance prediction.

Figure 7:
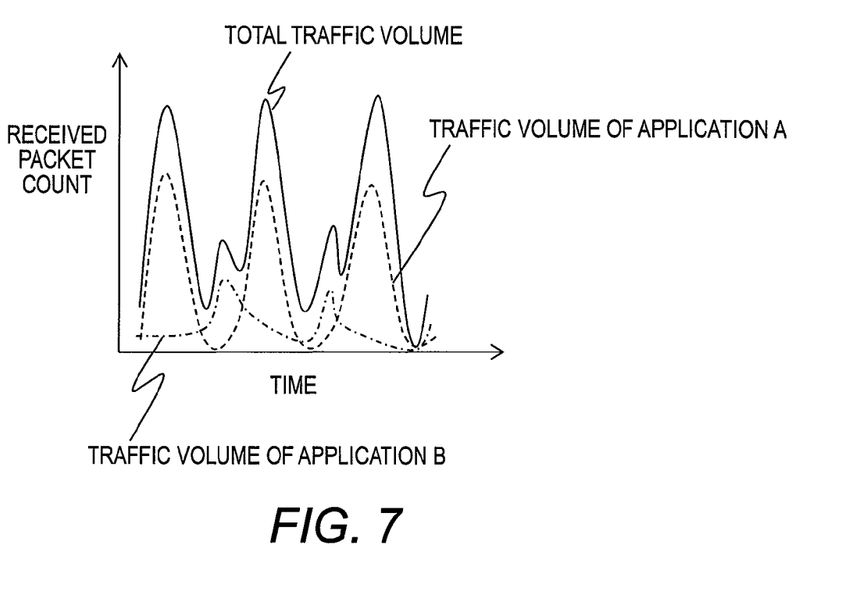
FIG. 7 is a diagram illustrating the result of predicting the traffic volume for each application type according to the first embodiment.

FIG. 7 is a diagram illustrating the result of predicting the traffic volume for each application type according to the first embodiment.

The total traffic volume observed is the sum of the traffic volume of the application A and the traffic volume of the application B. The total traffic volume in this case can be divided into the traffic volume of the application A and the traffic volume of application B by performing FFT on the total traffic volume. FFT is then performed on the traffic volume of each application separately so that a different frequency component is found through analysis for a different application.

In the example of FIG. 7 where the amplitude of the application A is large, FFT of the total traffic volume makes mainly the frequency component of the application A visible whereas the component of the application B is negligibly small. In case where FFT is performed for the application A and the application B separately, on the other hand, the frequency components of the traffic volumes of the respective applications are made visible. Consequently, predicting the traffic volume of the application A and the traffic volume of the application B and then adding the two prediction values yields a more precise prediction than a prediction for the total traffic volume.

A performance prediction method that uses an average value and deviation of traffic is described next in detail. In the performance prediction described below, performance required in the future is predicted by using the average traffic volume up to the present and a deviation for the traffic volume.

An average traffic volume P(t) is obtained from an average value (or moving average or weighted average) of the packet count or byte count of packets received for a predetermined period of time in the past. A deviation σ(t) for the traffic volume is obtained from a standard deviation for the packet count or byte count of packets received in a predetermined period of time in the past. A parameter t here is the current time.

The performance prediction that uses an average value and deviation of traffic predicts the traffic volume by, for example, an expression "nP(t)+mσ(t)" (n and m are each an arbitrary constant (a positive number in general)). In case where the deviation σ(t) is large, the traffic volume fluctuates greatly and it is necessary to allow for margin to performance.

The average calculating part 1704 and deviation calculating part 1705 of this embodiment calculate an average value and a deviation, respectively, for all traffic and further calculate an average value and a deviation for each application type. An average value and a deviation that are specific to an application type are thus calculated, and the traffic volume is predicted from the calculated average value and deviation.

A performance prediction method that uses flags of TCP is described next.

Figure 8:
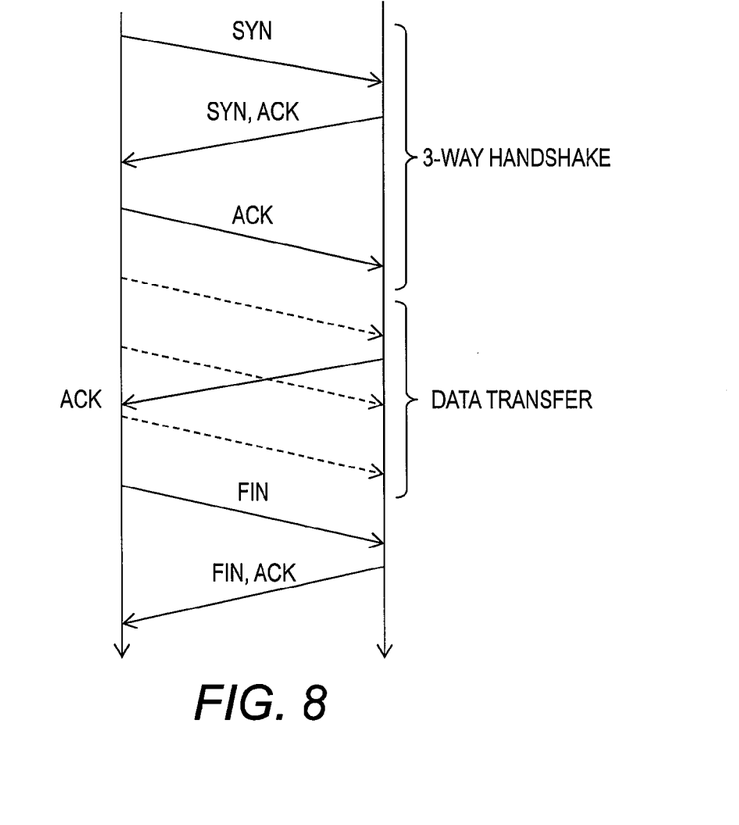
FIG. 8 is a diagram illustrating the sequence of communication that uses TCP.

FIG. 8 is a diagram illustrating the sequence of communication that uses TCP.

Communication that uses TCP establishes connection by 3-way handshake, and data transfer is started after the connection is established. The part of this communication that mainly concerns an increase in traffic volume is data transfer. Data transfer starts slow (in a small amount) by window size control, which creates a time difference between the 3-way handshake sequence and an increase in traffic volume. The performance prediction method that uses TCP flags utilizes the time difference between the 3-way handshake sequence and an increase in traffic volume to predict the future traffic volume. Specifically, the count of established connections is predicted by counting SYN flags (and FIN flags as well) and burst traffic is predicted by further taking into account the time elapsed since the establishment of the connections.

In this embodiment, the average calculating part 1704 calculates the count of flags. Specifically, the average calculating part 1704 counts only SYN flags per unit time or measures a difference between the count of SYN flags per unit time and the count of FIN flags per unit time, to thereby estimate the count of valid established connections. These prediction results may be multiplied by an appropriate coefficient in order to predict the traffic volume.

The trend of changes in traffic volume can also be extracted by calculating moving averages or weighted averages of the SYN flag count and/or the FIN flag count at different weights or in different periods and comparing the calculated averages. Specifically, an increase in traffic may be predicted by obtaining moving averages for different past periods (for example, one-second periods or ten-second periods) and comparing the two.

The performance prediction method that uses TCP flags may make a prediction for each application type. Specifically, SYN flags are counted for each application type separately. A different prediction method may be used for a different application type, and a different coefficient may be used for a different application type, because applications that communicate by TCP differ from one another in traffic volume depending on the application type. This method allows one to focus only on applications for which heavy traffic is predicted, and an accurate prediction can be made with a few resources.

The performance predicting part 1706 combines calculation results that are obtained by the performance prediction methods described above, thereby obtaining transfer performance to be set to the packet processing circuits 110 and the header information accumulating buffer 120. The precision of prediction may be evaluated by comparing a past prediction against an actual traffic volume so that feedback based on the result of the evaluation is given to the prediction method. The prediction precision can be improved in this manner.

As has been described, communication quality and power saving efficiency can be balanced in the first embodiment of this invention by controlling the performance of a packet transfer apparatus based on a predicted value of traffic volume. The first embodiment also reduces the influence of the delay time which is a time required to finish switching the performance of the packet transfer apparatus on deterioration in power saving efficiency and communication quality.

In addition, the trend of the traffic volume of an application which is missed in an observation of the total traffic volume can be detected by predicting the traffic volume for each application type separately, and the precision of traffic volume prediction is improved as a result.

The precision of traffic volume prediction can be improved further by counting SYN flags and thus detecting the sign of an increase in traffic volume.

Second Embodiment

Next, a second embodiment of this invention is described.

Figure 9:
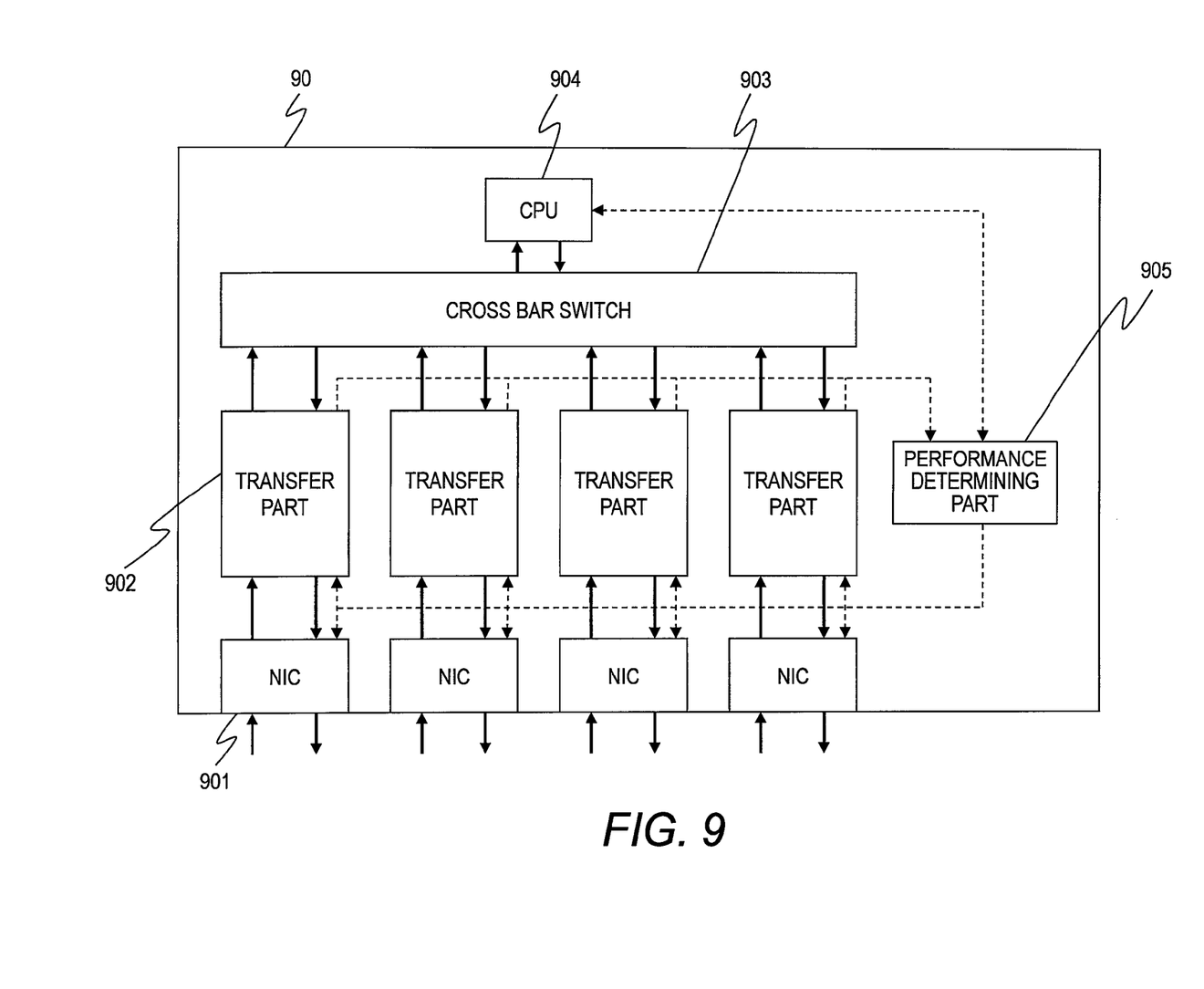
FIG. 9 is a block diagram illustrating the configuration of a network router according to a second embodiment.

FIG. 9 is a block diagram illustrating the configuration of a network router 90 according to the second embodiment.

The network router 90 is a packet transfer apparatus which transfers a packet input thereto, and includes a plurality of network interfaces (NICs) 901, transfer parts 902, a cross bar switch 903, a CPU 904, and a performance determining part 905.

The NICs 901 couple the network router 90 to a network. The transfer parts 902 execute processing of transferring packets that are received by the NICs 901. The cross bar switch 903 connects the transfer parts 902 and the CPU 904. The CPU 904 executes a program to control the operation of the network router 90. The performance determining part 905 controls the transfer performance of the router.

The performance determining part 905 has a configuration similar to that of the circuit count determining part 170 of the first embodiment. Specifically, the performance determining part 905 includes the traffic information memory area 1701, the FFT calculating part 1703, the average calculating part 1704, the deviation calculating part 1705, the performance predicting part 1706, and the circuit control part 1707. These components are the same as those described in the first embodiment.

Figure 10:
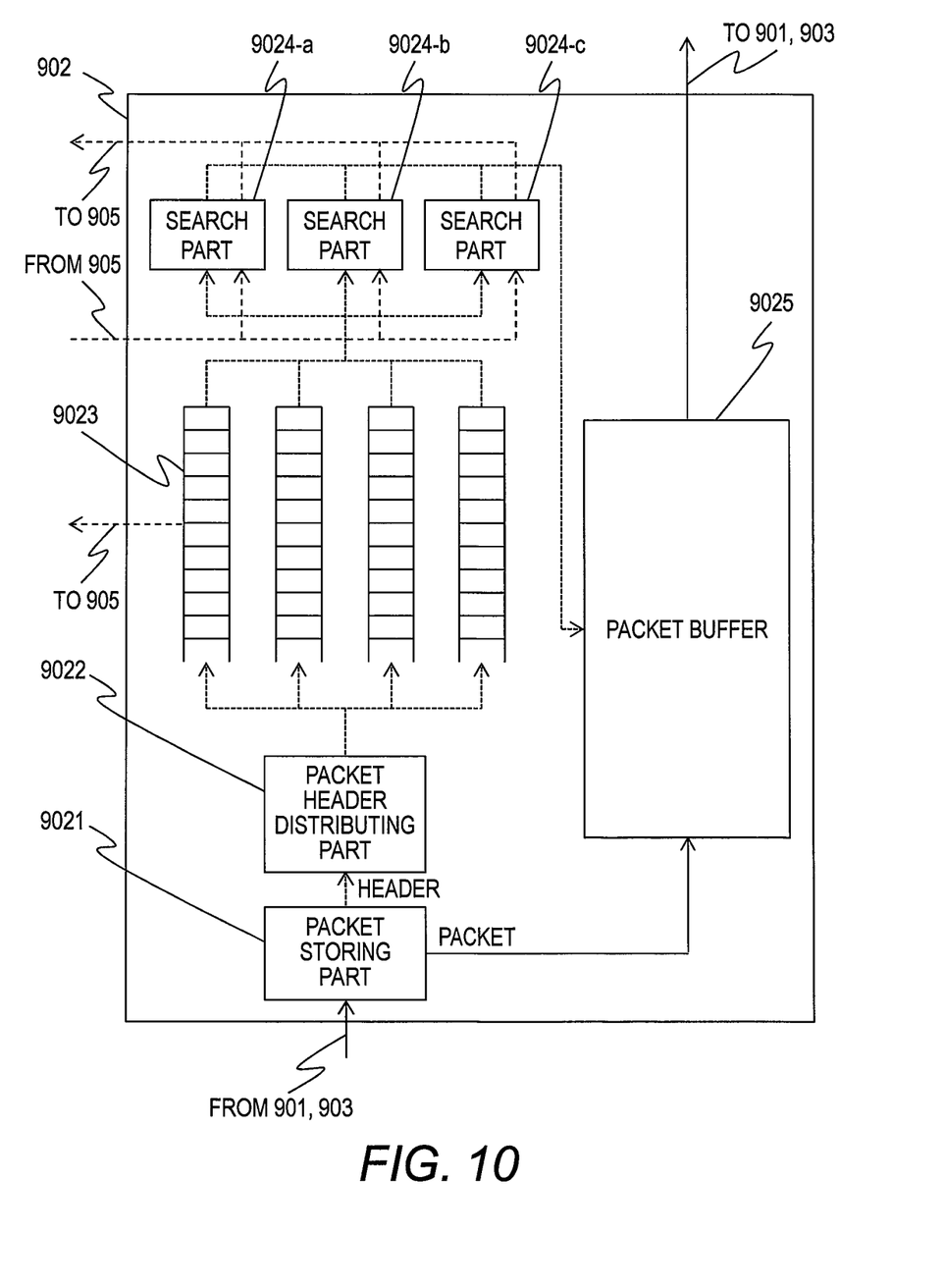
FIG. 10 is a block diagram illustrating a detailed configuration of each transfer part according to the second embodiment.

FIG. 10 is a block diagram illustrating a detailed configuration of each transfer part 902 according to the second embodiment.

The transfer part 902 includes a packet storing part 9021, a packet header distributing part 9022, packet header accumulating queues 9023, search parts 9024, and a packet buffer 9025.

One of the NICs 901 or the cross bar switch 903 sends a received packet to the packet storing part 9021. The packet storing part 9021 stores the received packet (or the body of the packet) in the packet buffer 9025, and sends the header of the packet along with information of an address in the packet buffer 9025 at which the packet is stored to the packet header distributing part 9022.

The packet header distributing part 9022 refers to the packet header to determine the type of the application, and allocates the input packet header to one of the plurality of packet header accumulating queues 9023 based on the result of the determination. The packet header stored in the packet header accumulating queue 9023 is allocated to one of the plurality of search parts 9024 by priority control or the like.

Each search part 9024 refers to a routing table and a flow control table to determine the transfer destination and transfer timing of a packet. The search part 9024 transmits a part of flow control information to the performance determining part 905. The search part 9024 notifies the result of the packet transfer determination and information of an address at which the packet is stored to the packet buffer 9025. The packet buffer 9025 transfers the stored packet to one of the NICs 901 or the cross bar switch 903 based on the determination result notified from the search part 9024.

When one of the packet header accumulating queues 9023 receives a packet, the packet header accumulating queue 9023 measures statistical information from the packet count and byte count of packets received per unit time, the count of TCP flags of the received packets, and the like, and transmits the result of the measurement to the performance determining part 905.

The performance determining part 905 integrates pieces of statistical information received from the plurality of transfer parts 902, determines required transfer performance, and transmits a signal for controlling the transfer parts 902 and the NICs 901. The transfer parts 902 and the NICs 901 may be controlled by changing the operation speed instead of shutting off power supply to the relevant transfer parts 902 and NICs 901. The NICs 901 may be controlled by shutting down the operation on a port-by-port basis, or by changing the link speed on a port-by-port basis.

The performance determining part 905 notifies information about transfer performance to the CPU 904.

The performance determining part 905 also predicts the future traffic by employing one of a performance prediction method that uses an average value and deviation of traffic, a performance prediction method that uses FFT, a performance prediction method that uses TCP flags, and a performance prediction method that utilizes the asymmetry of traffic, or by employing some of the methods in combination, in order to determine required transfer performance.

The performance prediction method that utilizes the asymmetry of traffic is described next.

The performance prediction method that uses FFT, the performance prediction method that uses an average value and deviation of traffic, and the performance prediction method that uses TCP flags are the same as those described in the first embodiment, and descriptions thereof are therefore omitted here.

Figure 11:
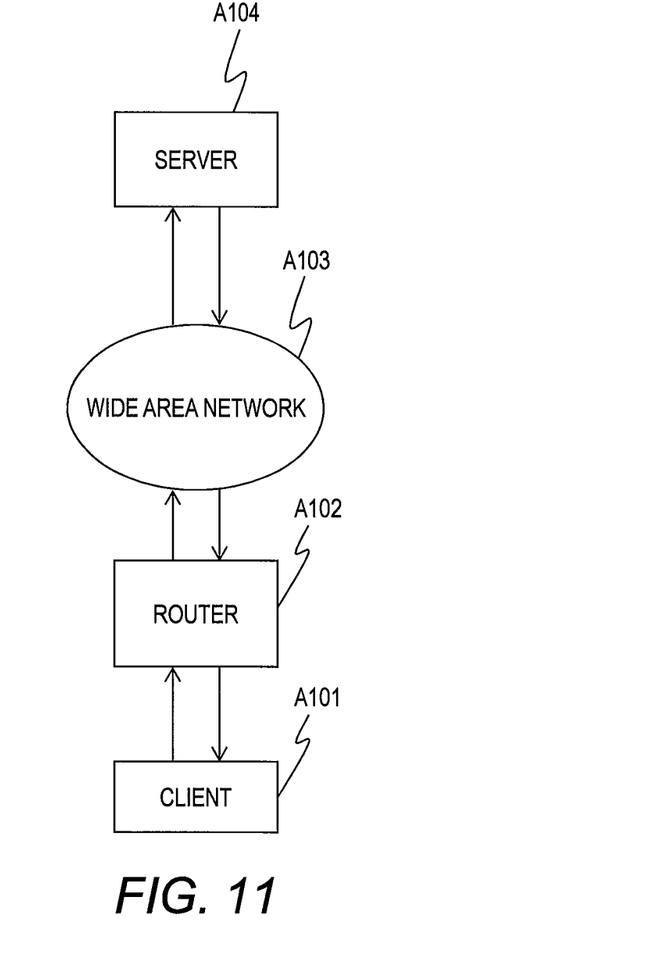
FIG. 11 is a diagram illustrating the configuration of a network system of a simple server-client model.

FIG. 11 is a diagram illustrating the configuration of a network system of a simple server-client model.

In the network system of FIG. 11, a client A101 and a server A104 communicate via a network router A102 and a wide area network A103. The communication flow in this case is such that a request transmitted from the client A101 is transferred to the server A104 via the network router A102 and the wide area network A103. The server A104 transmits a reply to the request to the client A101 along the reverse route via the wide area network A103 and the network router A102.

In server-client model communication such as HTTP access and FTP access, the size of data transmitted as a reply is generally larger than the size of data transmitted as a request.

The network router A102 can therefore predict the possibility of heavy traffic transmission from the server A104 in near future (for example, after the elapse of a time corresponding to an RTT that is learned from the past traffic) by monitoring requests that are transmitted from the client A101. In this embodiment, each search part 9024 detects a request newly issued by an application of a particular type and sends a notification of the detection of the request to the performance determining part 905. The performance determining part 905 thus utilizes request detection to predict an increase in data amount due to a reply.

The traffic volume may be predicted by analyzing the contents of an HTTP request. In the case where an HTTP request is in a GET format, a resource (for example, screen data) on the server A104 is requested, and an increase in data amount due to a reply can accordingly be predicted.

Figure 12:
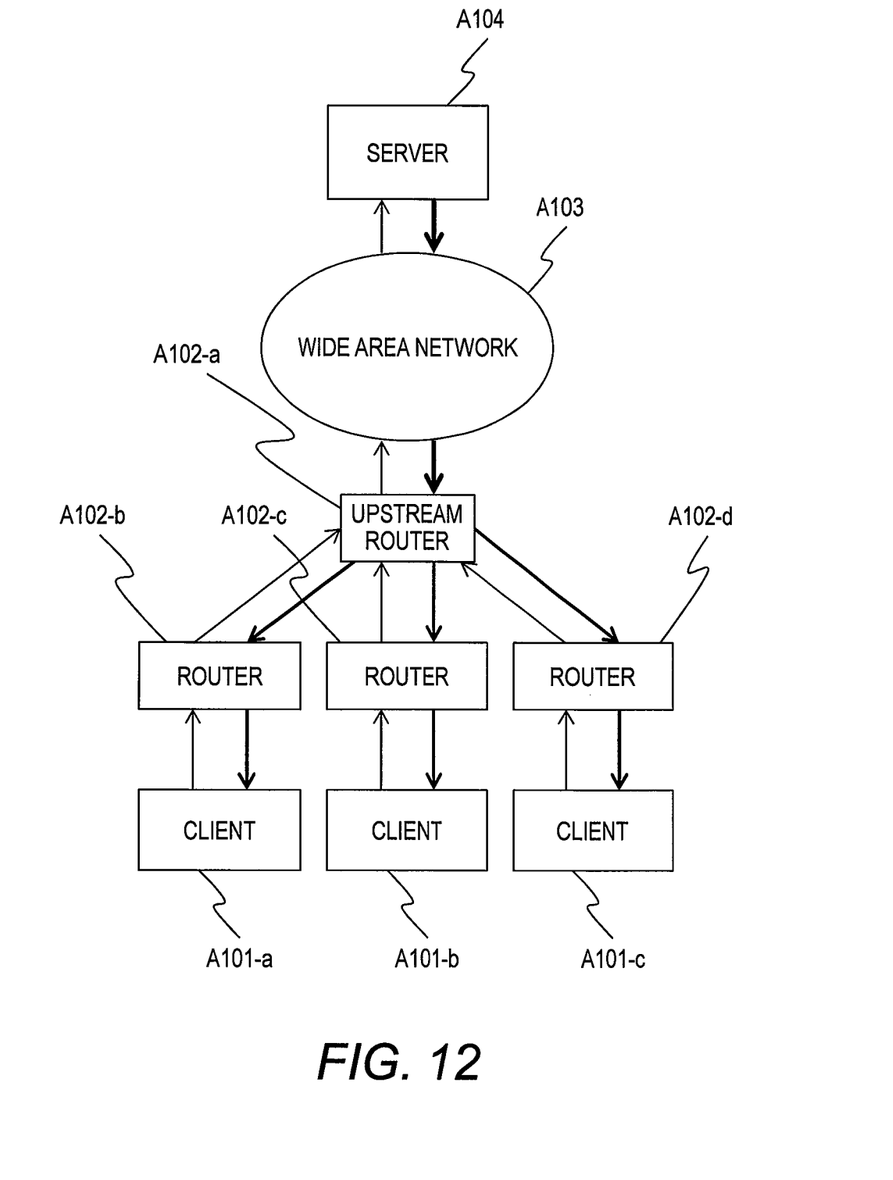
FIG. 12 is a diagram illustrating the configuration of a server-client model that is built on a large-scale network system.

FIG. 12 is a diagram illustrating the configuration of a server-client model that is built on a large-scale network system.

A network at a base such as an office where a large number of users are located has a tree structure, and a client A101-*a* is coupled to the wide area network A103 via a downstream router A102-*b* and an upstream network router A102-*a*. The network router A102-*b* and other lower network routers A102 monitor requests issued from the client A101-*a* and other clients A101, and transmit the count of issued requests to the upstream network router A102-*a*. The transfer performance of the upstream network router A102-*a* is controlled in this manner.

The performance determining part 905 of the downstream router A102-*b* therefore sends information about the count of issued requests to the CPU 904. The CPU 904 creates a packet destined to the upstream network router A102-*a*. The network router A102-*a* sends the packet received from the downstream router A102-*b* to the CPU 904 of the network router A102-*a*. The CPU 904 of the network router A102-*a* analyzes the contents of the received packet and sends the information about the count of issued requests to the performance determining part 905.

This configuration eliminates the need for the upstream network router A102-*a* which oversees many clients to directly monitor requests among heavy traffic for transfer, and monitoring load can thus be balanced.

Alternatively, the upstream router A102-*a* may transmit the count of issued requests to the router A102-*b* and other downstream routers. With the upstream router A102-*a* monitoring requests, the performance of the downstream router A102-*b* can be controlled without affecting the transfer performance of the downstream router A102-*b* even in case where the downstream router A102-*b* has low performance.

As has been described, in the second embodiment of this invention, a performance determining part is provided to control the overall transfer performance of a network router (packet transfer apparatus), and transfer performance can therefore be controlled accurately.

In addition, a traffic volume predicted with the use of the monitored request count is transferred to an upstream or downstream router, thereby enabling the router that receives the predicted value of traffic volume to control transfer performance without calculating a prediction.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (a Solid State Drive), or a storage medium such as an IC card, or an SD card. The drawings shows control lines and information lines as considered necessary for explanation but do not show all control lines or information lines in the products. It can be considered that almost of all components are actually interconnected.

What is claimed is:

1. A network apparatus for transferring packets, comprising:
   a transmitter for transferring received packets to a given destination; and
   a determining logic for obtaining a traffic volume of the received packets to be transferred,
   wherein the determining logic determines a periodicity of changes to the traffic volume, generates a traffic volume prediction after a predetermined period of time with use of the determined periodicity, and controls transfer performance of the transmitter based on a result of the traffic volume prediction,
   wherein the determining logic monitors requests for services provided by a server, the monitored requests are contained in the received packets to be transferred, and generates the traffic volume prediction after the predetermined period of time with use of a count of the monitored requests, and
   wherein the traffic volume prediction is transferred to at least one of other network apparatuses coupled upstream and downstream of the network apparatus so that the at least one of the other network apparatuses controls transfer performance.

2. The network apparatus according to claim 1, wherein the determining logic determines the periodicity of changes to the traffic volume for each type of application that transmits the received packets to be transferred, and predicts traffic volume after the predetermined period of time for each type of the application of using the determined periodicity.

3. The network apparatus according to claim 1, wherein the determining logic generates the traffic volume prediction after the predetermined period of time with use of a count of synchronization (SYN) flags that are contained in Transmission Control Protocol (TCP) headers of the packets to be transferred.

4. The network apparatus according to claim 3, wherein the determining logic obtains the count of SYN flags that are contained in TCP headers of the packets to be transferred for each application type, and generates the traffic volume prediction after the predetermined period of time for each application type with use of the SYN flag count obtained for each application type.

5. A performance control method for controlling transfer performance of a network apparatus for transferring packets,
the network apparatus including a transfer part for transferring received packets to a given destination and a determining part for obtaining a traffic volume of the received packets to be transferred,
the performance control method comprising steps of:
determining, by the determining part, a periodicity of changes to the traffic volume;
predicting, by the determining part, a traffic volume prediction after a predetermined period of time with use of the determined periodicity; and
controlling, by the determining part, transfer performance of the transfer part based on a result of the traffic volume prediction;
monitoring requests for services provided by a server, the monitored requests are contained in the received packets to be transferred;
transferring the traffic volume prediction to at least one of other network apparatuses coupled upstream and downstream of the network apparatus so that the at least one of the other network apparatuses controls transfer performance, wherein the traffic volume prediction is generated based on a count of the monitored requests,
wherein the traffic volume prediction includes predicting the traffic volume after the predetermined period of time with use of the count of the monitored requests.

6. The performance control method according to claim 5, wherein the step of determining the periodicity includes determining the periodicity of change to the traffic volume for each type of application that transmit the received packets to be transferred, and
wherein the step of generating the traffic volume prediction includes predicting traffic volume after the predetermined period of time for each type of application with use of the determined periodicity.

7. The performance control method according to claim 5, wherein the step of predicting the traffic volume prediction includes predicting traffic volume after the predetermined period of time with use of a count of SYN flags that are contained in TCP headers of the packets to be transferred.

8. The performance control method according to claim 7, further including a step of obtaining, by the determining part, the count of SYN flags that are contained in TCP headers of the packets to be transferred for each application type,
wherein the step of predicting the traffic volume prediction includes predicting traffic volume after the predetermined period of time for each application type with use of the SYN flag count obtained for each application type.

9. A network system, comprising:
a first network apparatus for transferring packets; and
a second network apparatus which is coupled one of upstream and downstream of the first network apparatus,
wherein the first network apparatus and the second network apparatus each comprise a transmitter for transferring received packets to a given destination and a determining logic for obtaining a traffic volume of the received packets to be transferred,
wherein the determining logic of the first network apparatus monitors requests for services provided by a server, the monitored requests are contained in the received packets to be transferred, generates a traffic volume prediction after a predetermined period of time with use of a count of the monitored requests, and transmits the traffic volume prediction to the second network apparatus, and
wherein the determining logic of the second network apparatus controls transfer performance of the transmitter of the second network apparatus based on a result of the traffic volume prediction, which is transmitted from the first network apparatus.

* * * * *